(12) United States Patent
Swanson (10) Patent No.: US 7,975,163 B1
(45) Date of Patent: Jul. 5, 2011

(54) APPARATUS AND METHOD FOR MASKING A CLOCK SIGNAL

(75) Inventor: Ross Swanson, Lyons, CO (US)

(73) Assignee: Marvell International Ltd. (BM)

( * ) Notice: Subject to any disclaimer, the term of this patent is extended or adjusted under 35 U.S.C. 154(b) by 800 days.

(21) Appl. No.: 11/874,610

(22) Filed: Oct. 18, 2007

Related U.S. Application Data (60) Provisional application No. 60/862,888, filed on Oct. 25, 2006.

(51) Int. Cl.
*G06F 1/04* (2006.01)
(52) U.S. Cl. .................................. 713/600; 713/601
(58) Field of Classification Search .............. 713/300, 713/310, 320, 324, 500, 501, 600, 601
See application file for complete search history.

(56) References Cited

U.S. PATENT DOCUMENTS

| 4,651,334 | A | * | 3/1987 | Hayashi | 377/108 |
| 5,018,168 | A | * | 5/1991 | Matsuoka | 375/354 |
| 6,756,827 | B2 | * | 6/2004 | Konuk et al. | 327/116 |
| 7,274,240 | B2 | * | 9/2007 | Siegler et al. | 327/291 |

* cited by examiner

*Primary Examiner* — Thomas Lee
*Assistant Examiner* — Paul B Yanchus, III (57) ABSTRACT

A system and method are disclosed for masking a clock input from a clock line when the clock line is not being driven by a clock source. The clock mask is triggered by a clock cycle from the clock source. In one version, a memory controller configures a masking circuit to either allow a clock signal to the clock input or to mask the clock input from a bidirectional clock bus. The masking circuit may comprise a storage element and a gate, as an example.

23 Claims, 7 Drawing Sheets

APPARATUS AND METHOD FOR MASKING A CLOCK SIGNAL

RELATED APPLICATION

This application claims the benefit of U.S. Provisional Application No. 60/862,888, filed on Oct. 25, 2006, which is incorporated herein by reference.

BACKGROUND

1. Technical Field

The present disclosure relates to integrated circuits, and more particularly, to triggering a component for masking a signal from a clock source.

2. Related Art

Most integrated circuits communicate data between components by way of one or more data busses. A data bus provides a channel for communicating data between two or more components within a single integrated circuit, or between components (or devices) on two or more integrated circuits. A bidirectional data bus can communicate data in either direction between two components so that the components use the same bus for data flow in both directions. Typically, a memory controller manages the flow of data between the components. For example, a memory controller may send command signals to the components to indicate that, for a specified time interval, a first component is to send data to the bus and a second component is to receive the data from the bus.

A circuit or system that implements a bidirectional data bus may utilize more than one clock domain. For example, the memory controller, the first component, and the second component discussed above may each have a clock driver to generate clock signals for component activity, such as data transfer. Typically, the timing of data latching/communication over a bidirectional data bus, for both the sending and receiving component, is controlled by the clock driver associated with the component that is sending the data. In other words, the component that is receiving the data also receives the clock signal that is generated by the clock driver of the component that is sending the data. The components may share a clock line, such as a bidirectional clock line or clock bus, for communicating their clock signals to one another.

Typically, when the clock line is not being driven (i.e., carrying a clock signal) by either clock driver, it is latent and in a high impedance state. In this state, the clock line may float due to parasitic capacitive coupling and other effects caused by nearby signal paths in the component. The floating state of the clock line may, at times, resemble a clock transition. Such "false" transitions can trigger one or both of the components to latch unintended signals at their data ports. To prevent the floating state of the clock line from having these unintended effects, each component may include a clock filter to "isolate" the component from the clock line when the clock line is not being driven by a clock driver.

Figure 1:
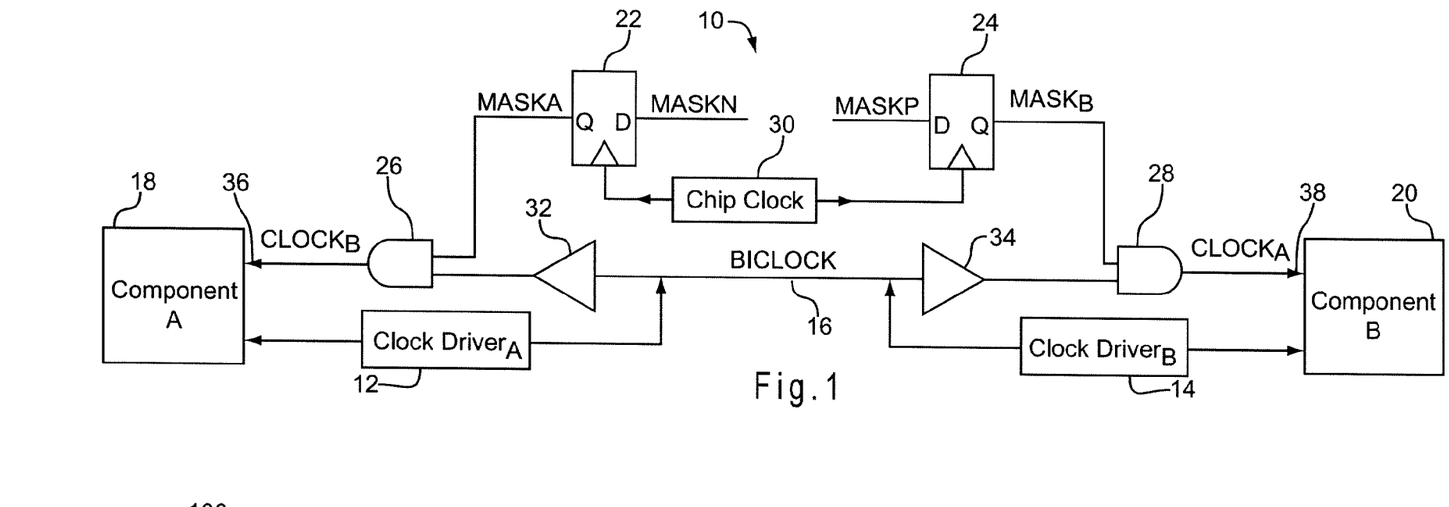
FIG. 1 is an illustration of a clock mask system wherein the mask is triggered by the chip clock.

An example of a clock filter system 10 is shown in FIG. 1. Either one of two clock drivers, clock driver$_A$ 12 or clock driver$_B$ 14, generates a clock signal to (in this example) a bidirectional clock line (BICLOCK) 16 under the control of a memory controller (not shown). BICLOCK 16 includes buffers 32, 34 having outputs as inputs to AND gates 26, 28, respectively. In the illustrated example, each clock driver 12, 14 is associated with a component. Component A 18 has clock driver$_A$ 12 for generating clock signals when component A 18 is communicating data to component B 20. Similarly, component B has clock driver$_B$ 14 for generating clock signals when component B 20 is communicating data to component A 18. Component A 18 has a clock input 36 for receiving a clock signal (CLOCK$_B$) from BICLOCK 16 when component B 20 is sending data. Similarly, component B 20 has a clock input 38 for receiving a clock signal (CLOCK$_A$) from BICLOCK 16 when component A 18 is sending data.

D flip-flops 22 and 24 provide mask signals MASKA and MASKB to the AND gates 26 and 28, respectively. The mask signals are set low when BICLOCK 16 is not being driven, so that the AND gates 26 and 28 mask CLOCK$_B$ and CLOCK$_A$ from BICLOCK 16 when it is in a high impedance state. Stated another way, when BICLOCK 16 is floating, MASKA and MASKB are set low by control signals MASKN and MASKP, respectively, so that floating transitions cannot propagate through the AND gates 26, 28. The control signals MASKN and MASKP are usually provided by a memory controller.

Figure 2:
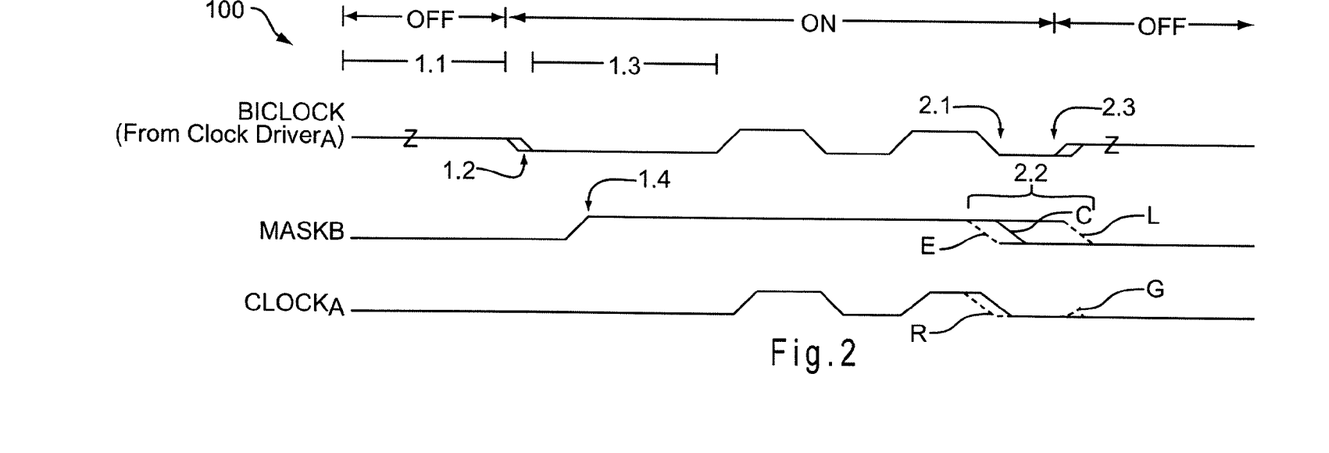
FIG. 2 is a timing diagram of several signals in the clock mask system of FIG. 1.

When data is to be transmitted, for example from component A 18 to component B 20, along a data bus (not shown), clock driver$_A$ 12 generates a clock signal for component A 18 and for BICLOCK 16 for receipt at component B 20. A "preamble" defines the time interval starting when the clock driver$_A$ 12 initially drives BICLOCK (typically ↓) and ends just before the start of the first clock pulse. FIG. 2 is a timing diagram for transmitting a clock signal from clock driver$_A$ 12 to component B 20:

1.1 clock driver$_A$ and clock driver$_B$ are OFF; BICLOCK is in a high impedance state; MASKB is low to block CLOCK$_A$ from BICLOCK
    1.2 clock driver$_A$ turns ON
    1.3 Preamble: MASKP ↑ MASKB ↑
    1.4 CLOCK$_A$=BICLOCK (from clock driver$_A$)
    2.1 end of data transfer
    2.2 MASKP ↓ MASKB ↓
    2.3 clock driver$_A$ turns OFF; BICLOCK is again in a high impedance state At 2.2, MASKB will sample MASKP only when chip clock 30 goes high. Therefore, to ensure that MASKB masks CLOCK$_A$ from BICLOCK 16 at the correct time, chip clock 30 (inverted) must be aligned with BICLOCK 16. When the chip clock 30 and BICLOCK 16 are ideally aligned, MASKB goes low at C, the final set of data is latched at the right time, and CLOCK$_A$ is isolated from BICLOCK 16 at the right time. Stated another way, when MASKB goes low at C, the falling edge of CLOCK$_A$ is aligned with the falling edge of the last intended clock signal on BICLOCK 16. However, if chip clock 30 is not aligned to BICLOCK 16, MASKB (following MASKP) may go low too early E or too late L, as shown.

If MASKB goes low too early E, then CLOCK$_A$ will go low too early R, and component B 20 may latch in signals from the data bus before component A 18 has latched its data on the data bus. This may result in erroneous data being latched in component B 20.

Its possible that BICLOCK 16 may turn off (to a high impedance state) before CLOCK$_A$ is masked from BICLOCK 16. This would happen if MASKB goes low too late L. As stated above, in a high impedance state noise may be easily induced on BICLOCK 16. The noise may cause a glitch G on CLOCK$_A$. The glitch G may cause component B 20 to latch in erroneous data from the data bus.

As stated earlier, accurate masking (C) is dependent upon having the chip clock 30 aligned with BICLOCK 16, i.e., with clock driver$_A$ 12 (and, in the opposite direction, with clock driver$_B$ 14). Meeting this timing constraint is difficult because clock driver$_A$ 12 and clock driver$_B$ 14 are inherently shifted in time from the chip clock 30 due to path delays on chip pads, board routing, and voltage, temperature, and process variations. Attempts to meet the timing constraint include adding circuitry to delay either the chip clock signal or the clock driver signals. However, adding circuitry results in further intricacies, increases costs, and adds another level of dependence on precise component specifications. An improved approach is desirable.

BRIEF SUMMARY

The following embodiments relate to systems and methods of allowing a clock signal from a clock driver/clock line to drive a component until a mask is triggered by a clock transition of the clock signal. Because the clock signal from the clock driver/clock line triggers the mask (rather than a clock signal from another clock source), the mask is neither premature nor delayed relative to the clock transition of the clock signal from the clock driver/clock line.

In a preferred embodiment, a masking circuit includes a gate and a storage element. The gate may be an AND gate and the storage element may be a D flip-flop, as examples. The AND gate has a first input, a second input, and a gate output. The first input of the AND gate receives the latched output from the D flip-flop, which is the masking signal. The second input of the AND gate receives the clock signal from the clock line. The output of the AND gate is provided to the clock input of the D flip-flop and to the component that is to be driven by the clock signal.

In one implementation, a signal generator provides a first signal to a set input of the D flip-flop to set the output of the D flip-flop high, allowing the clock signal through the AND gate. The signal generator provides the first signal only after the clock driver begins driving the clock line. The signal generator provides a second signal to a data input of the D flip-flop. The second signal remains high until the clock signal is within one clock period of its final transition. Within one clock period of the final transition the second signal is set low so that the D flip-flop latches the low state at its output at the final transition of the clock signal. The AND gate receives the low state and responsively masks the gate output from the clock line. The mask may remain on until the signal generator provides first and second signals to allow the clock driver/clock line to again drive the component.

The signal generator may be a hardware, firmware, or software based memory controller, as examples.

According to another embodiment, a computer readable storage medium has processor executable instructions for driving a clock signal, setting a first control signal to allow the clock signal to be communicated to a clock input, and setting the first control signal and a second control signal to trigger a clock mask with the clock signal to mask the clock input from transitions on the clock line. The computer readable storage medium may also include processor executable instructions to execute one or more of the following: set a storage element with the first control signal; communicate the second control signal to a data input of a storage element; set a mask control signal within one clock cycle of a final transition of the clock signal; and set a first control signal within a preamble period to remove the clock mask.

According to yet another embodiment, an apparatus comprises means for communicating a clock signal from a clock line to a clock input and means for triggering a mask with the clock signal to mask the clock input from the clock line. The apparatus may also include one or more of means for resetting the mask; means for setting the mask based on a control signal; means for setting the mask at a final transition of the clock signal; and means for resetting the mask within a preamble period.

According to another embodiment, a computer readable storage medium includes processor executable instructions for communicating a clock signal to a bidirectional clock bus and allowing the clock signal to trigger a mask to mask a component from the bidirectional clock bus. The computer readable storage medium may also include processor executable instructions to execute one or more of the following: set the mask to an off state; maintain the mask at the off state; communicate a first control signal to a set terminal of a storage element; and communicate a second control signal to a data input terminal of the storage element, wherein the first and second control signals determine whether the mask is in the off state.

According to yet another embodiment, an apparatus comprises means for communicating a clock signal from a bidirectional clock bus to a component and means for triggering a mask to mask the component from the bidirectional clock bus, based on the clock signal. The apparatus may also include one or more of: means for triggering a mask by a final clock pulse of the clock signal; means for setting the mask circuit to an off state; and means for maintaining the mask circuit at the off state.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention.

Moreover, in the figures, like referenced numerals designate corresponding parts or elements throughout the different views.

The embodiments below relate to a clock masking system wherein the mask is triggered directly by a clock signal generated by the clock driver of the component that is driving the clock line, such as a bidirectional clock bus. Consequently, a component that is receiving its clock signal from the clock line has its clock input masked precisely at the trailing edge of the final clock cycle from the clock driver. In one version, a memory controller has nearly an entire clock cycle to provide control signals to set the clock masking system to a state wherein the clock mask will be triggered at the trailing edge of the final clock cycle from the clock driver. Triggering the clock mask with the trailing edge of the final clock cycle from the clock driver prevents the mask from triggering early (which would imitate a premature/early clock transition) or late (which may allow glitches on the clock line to clock the component).

Figure 3:
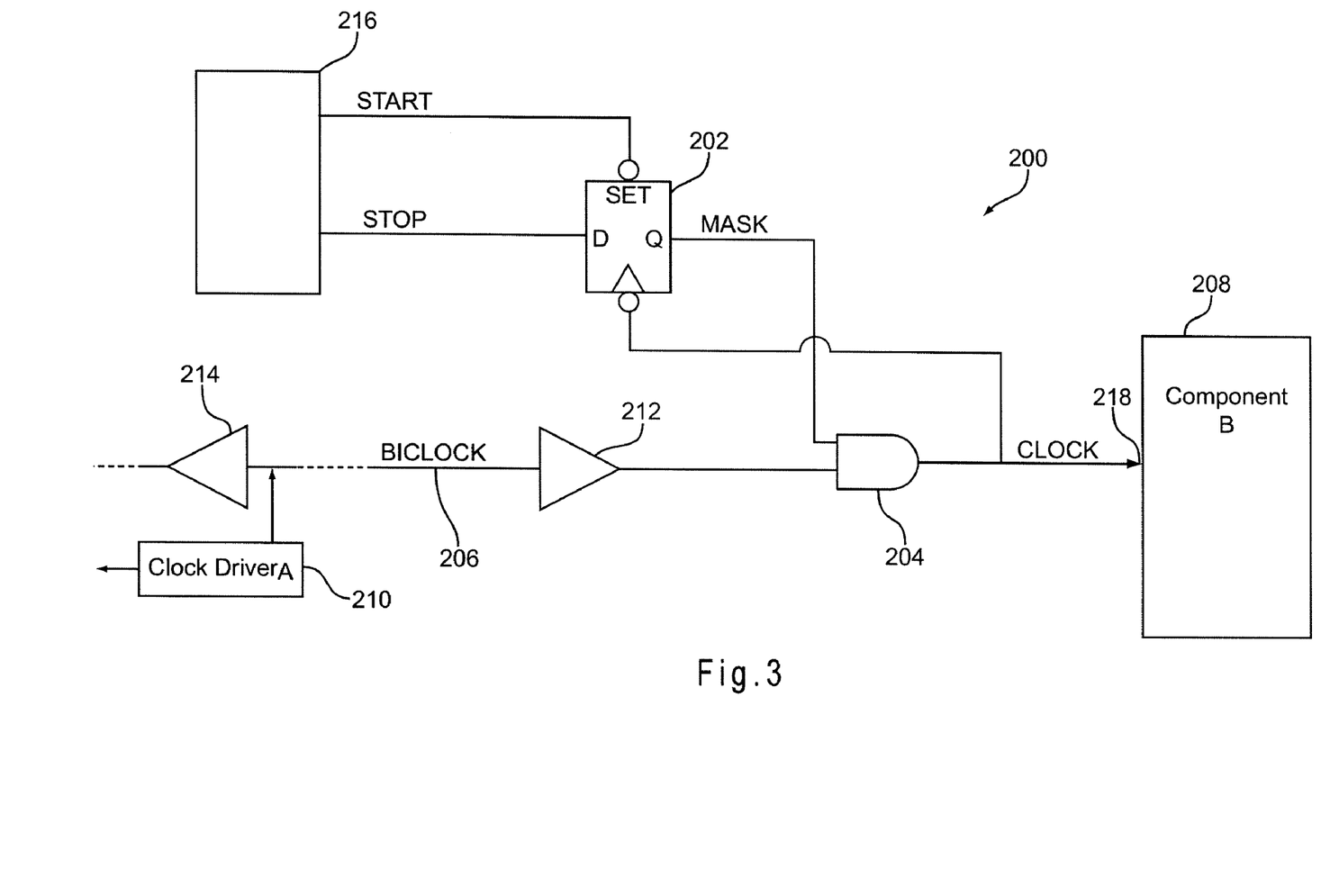
FIG. 3 is an illustration of an embodiment of a clock mask system of the present invention wherein the mask is triggered by a clock signal from the clock bus (BICLOCK)

FIG. 3 is a diagram of a version of a clock masking system 200 wherein the mask is triggered directly by the clock signal from the clock driver of the component that is driving the clock line 206. The clock line 206 may be a bidirectional clock bus or any other component capable of carrying a clock signal, and is periodically referred to herein by the state of the signal that it carries (BICLOCK). However, it is noted that the clock masking system 200 is not limited for use with a bidirectional clock line. Also, in FIG. 3 and the discussion below it is assumed that the clock line 206 is to be driven by Clock Driver$_A$ 210 and Component B 208 is the component that is to receive the clock signal. Therefore, although Component B 208 may have an associated clock driver, for clarity of explanation it is not shown.

The clock line 206 may include a buffer 212 so that its state is not effected by the input of the AND gate 204. Component B 208 has a clock input 218 for receiving a clock signal (CLOCK) from the clock line 206 (BICLOCK). In one implementation, component B 208 is a memory device that communicates data by way of a bidirectional data bus. For example, component B 208 may be an application specific integrated circuit (ASIC) having a randomly accessible memory (RAM) or may be part of a memory storage mechanism such as an Electrically Erasable Programmable Read-Only Memory (EEPROM).

The clock masking system 200 includes a storage element, shown as a D flip-flop 202. Alternative storage elements include other edge triggered storage elements, including an edge triggered J-K flip-flop having its inputs tied in a D flip-flop arrangement, as an example. The AND gate 204, which may be referred to more generally as a logic element, has one input connected to the clock line 206 and the other input connected to the data output (Q) of the D flip-flop 202. The data output (Q) signal may be referred to as the MASK signal.

The output of the AND gate 204 is the CLOCK signal for the component (component B) 208 that is to receive data from component A (not shown). The AND gate 204 output is also connected to the inverted clock input of the D flip-flop 202. The inverted set input of the D flip-flop 202 receives a START signal and the D input receives a STOP signal. The START and STOP signals may be provided by any circuit, component, or device configured to provide control signals to the D flip-flop 202. For example, the START and STOP signals may be provided by a signal generator 216 such as a memory controller.

The START signal sets the MASK high to allow CLOCK=BICLOCK. Therefore, the START signal is preferable set low (because the SET input is inverted) after BICLOCK is out of a state of high impedance, but before the first clock pulse. This time window may be referred to as the preamble and its duration is preferably at least one clock cycle. As discussed below, MASK will be set low at the end of a data transfer cycle and will remain low (masking CLOCK from the bidirectional clock bus 206) until the START signal is set again.

The D input (STOP signal) remains high so that MASK remains high after the START signal returns high. The STOP signal is set low at some point after the second to last clock cycle. Then, Q latches the STOP signal at the falling edge of the last clock cycle, thereby latching MASK low and masking CLOCK from the clock line 206.

Figure 4:
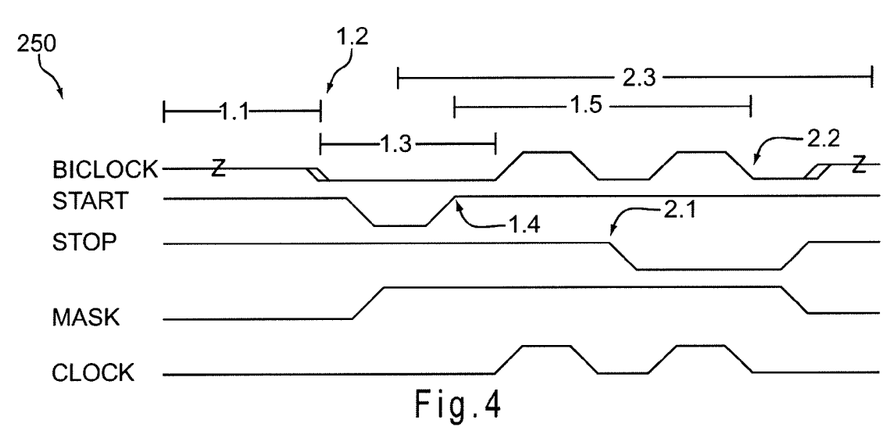
FIG. 4 is a timing diagram of several signals in the clock mask system of FIG. 3.

FIG. 4 is a timing diagram 250 showing the various states of the signals discussed above with reference to FIG. 3:

1.1 BICLOCK is in a high impedance state; START and STOP are high; MASK and CLOCK are low
1.2 clock driver turns ON, driving BICLOCK
1.3 Preamble: START ↓ to set Q and drive MASK ↑ to allow BICLOCK through AND gate
1.4 START returns ↑, but Q remains set because STOP is high
1.5 CLOCK=BICLOCK
2.1 after the second to last falling edge of BICLOCK, but before the final falling edge of BICLOCK, STOP ↓; Q will latch STOP at the final falling edge of BICLOCK
2.2 end of data transfer: final falling edge of BICLOCK; MASK ↓
2.3 START and STOP reset to high for next data transfer cycle In the version shown, the clock masking system 200 provides generous timing margins for the signal generator 216. For example, the signal generator 216 has almost a complete clock cycle (window) to provide the STOP signal and more than a clock cycle to provide the START signal. Therefore, the signal generator 216 may be implemented by a broad range of hardware, software, or firmware devices, as examples. The generous timing margins are advantageous to circuit design and, combined with triggering the mask with the clock driver of the component that is driving the clock line, provide for an accurate mask.

Figure 5:
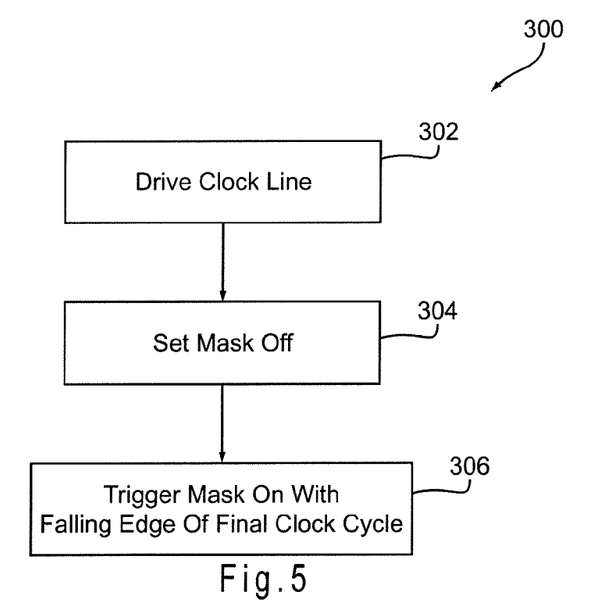
FIG. 5 is a flow chart showing acts for filtering signals from a clock line in accord with an embodiment of the present invention.

FIG. 5 is a flow chart showing acts 300 for masking a clock signal. The acts include setting the mask off (Act 304) only when the clock bus is being driven (Act 302). A further act includes triggering the mask on with the falling edge of the final clock cycle from the component driving the clock bus (Act 306). These acts 300 may be implemented in a system such as the clock masking system 200. Other acts, not shown, may be implemented for masking a clock signal. For example, any of the steps, acts, methods, and/or actions discussed above with reference to FIGS. 3 and 4 may be implemented for masking a clock signal, either in conjunction with or independent of the acts shown in FIG. 5.

Control signals, such as START and STOP, may be provided by a memory controller such as a processor, a microprocessor, a microcontroller, a DSP, an application specific integrated circuit (ASIC), discrete logic, or a combination of other types of circuits or logic. The memory controller may read computer readable instructions consistent with any of the acts discussed above and/or for providing the control signals. The function of the D flip-flop 202 may be implemented by another type of storage element, register, latch or other hardware device, or by a processor, a microprocessor, a microcontroller, a DSP, an application specific integrated circuit (ASIC), discrete logic, or any combination thereof. As noted above, the function of the AND gate 204 may be implemented by another type of logic element including other types of gates or combinations of gates. Further, the function of the AND gate 204 may be implemented by other hardware devices, or by a processor, a microprocessor, a microcontroller, a DSP, an application specific integrated circuit (ASIC), discrete logic, or any combination thereof.

Referring now to FIGS. 6(*a*) to 6(*h*), various exemplary implementations of the present invention are shown. Referring to FIG. 6(*a*), the present invention may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present invention may be implemented with either or both signal processing and/or control circuits, which are generally identified in FIG. 6(*a*) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Referring now to FIG. 6(*b*), the present invention may be implemented in a digital versatile disc (DVD) drive 410. The present invention may be implemented in either or both signal processing and/or control circuits, which are generally identified in FIG. 6(*b*) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

Figure 6A:
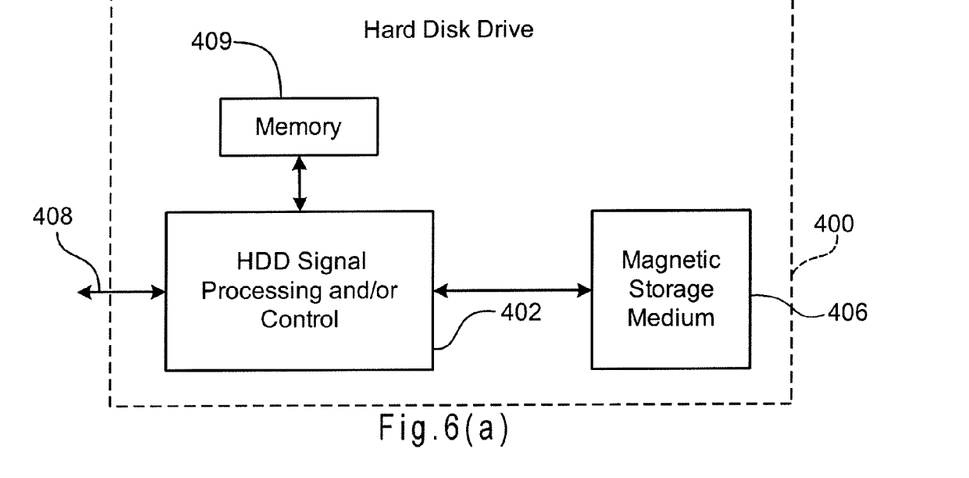
FIG. 6(a) is a functional block diagram of a hard disk drive.
Figure 6B:
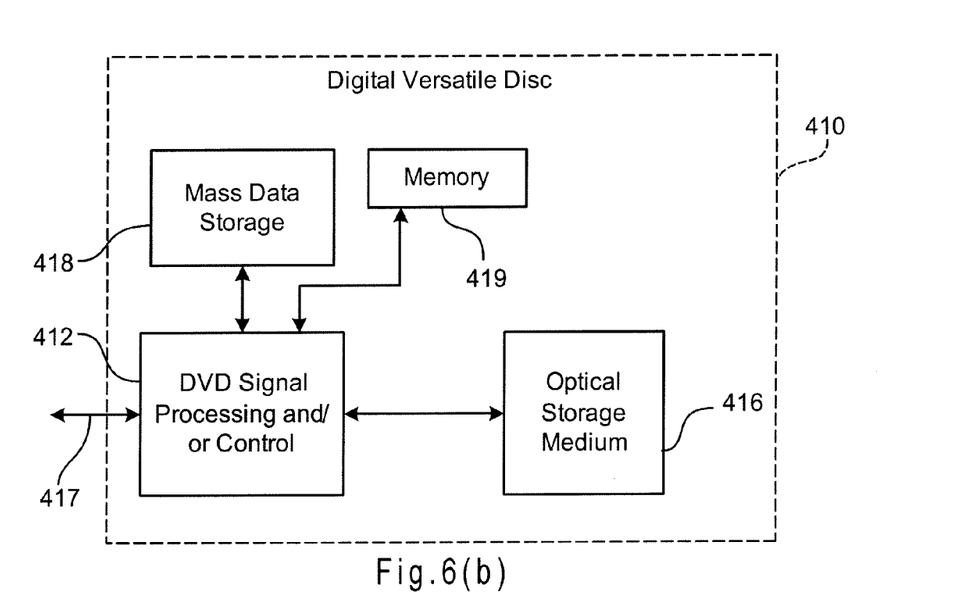
FIG. 6(b) is a functional block diagram of a digital versatile disk (DVD)

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 6(*a*). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Referring now to FIG. 6(*c*) the present invention may be embodied in a high definition television (HDTV) 420. The present invention may be implemented in either or both signal processing and/or control circuits, which are generally identified in FIG. 6(*c*) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

Figure 6C:
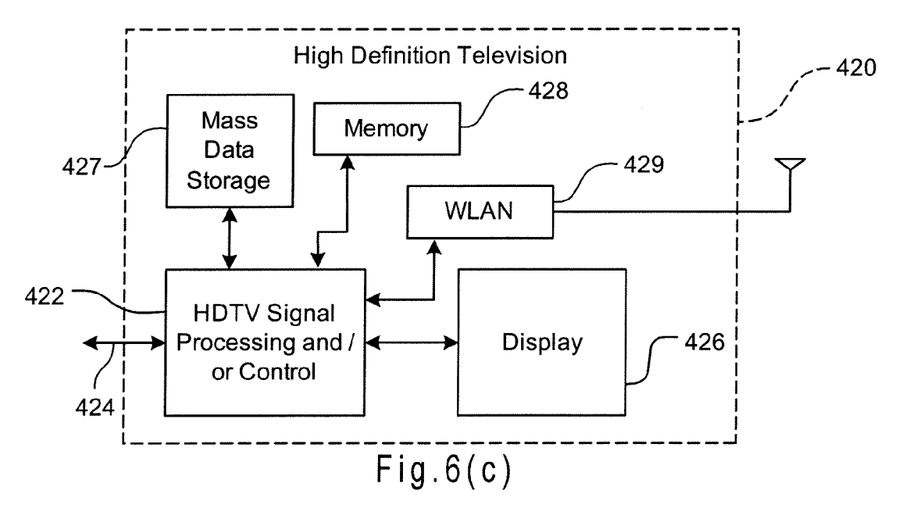
FIG. 6(c) is a functional block diagram of a high definition television.

HDTV 420 may communicate with mass data storage 427 that stores data in a nonvolatile manner such as optical and/or magnetic storage devices. At least one HDD may have the configuration shown in either FIG. 6(*a*) and/or at least one DVD may have the configuration shown in FIG. 6(*b*). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Referring now to FIG. 6(*d*), the present invention may be implemented in a control system of a vehicle 430, a WLAN interface 448 and/or mass data storage 446 of the vehicle control system. In some implementations, the present invention is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

Figure 6D:
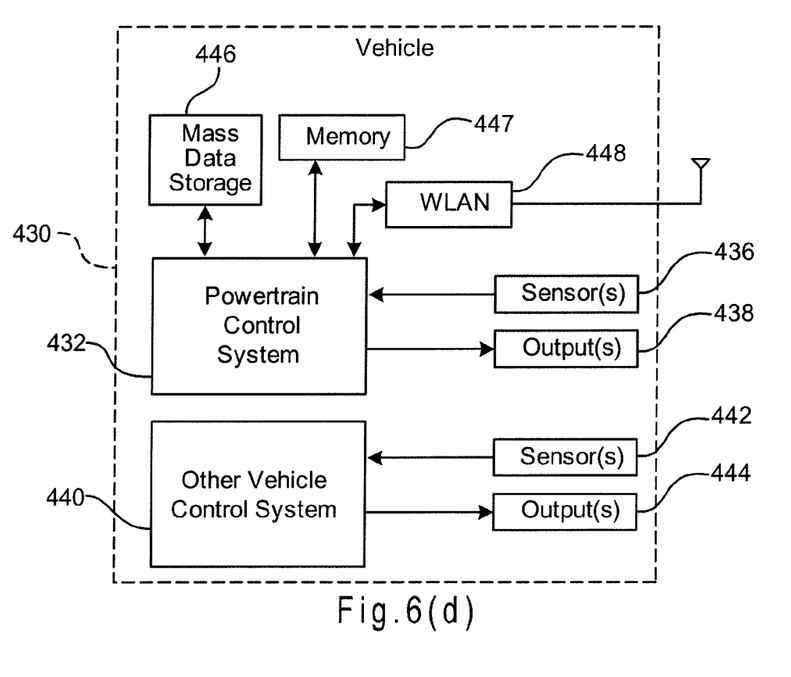
FIG. 6(d) is a functional block diagram of a vehicle control system.

The present invention may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 6(*a*) and/or at least one DVD may have the configuration shown in FIG. 6(*b*). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Referring now to FIG. 6(*e*), the present invention may be embodied in a cellular phone 450 that may include a cellular antenna 451. The present invention may be implemented in either or both signal processing and/or control circuits, which are generally identified in FIG. 6(*e*) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Figure 6E:
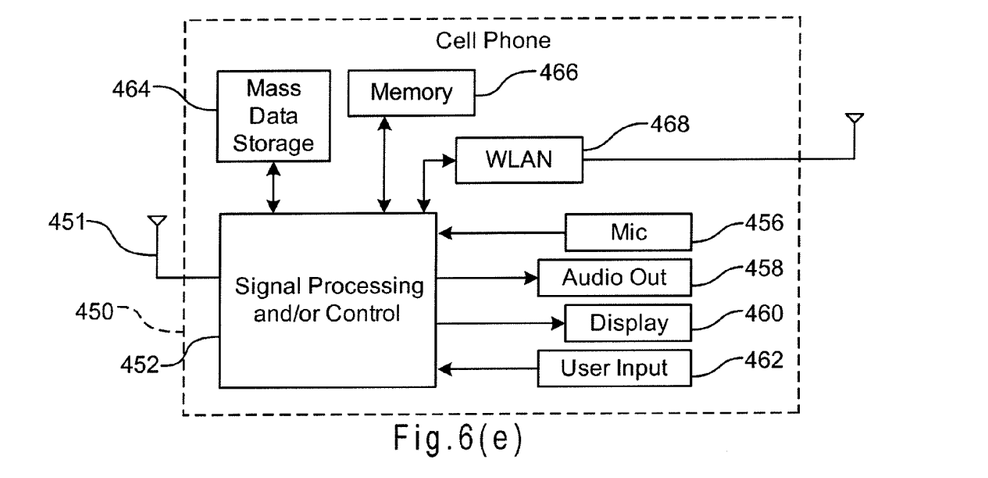
FIG. 6(e) is a functional block diagram of a cellular phone.

Cellular phone 450 may communicate with mass data storage 464 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 6F:
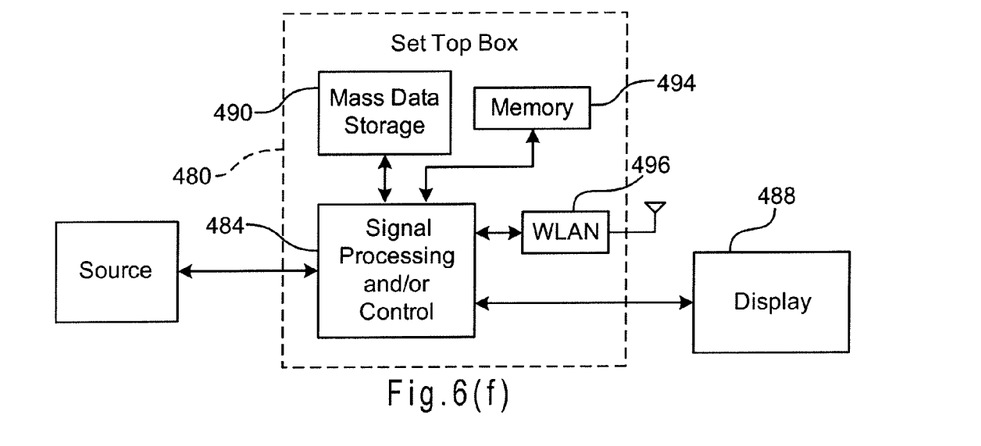
FIG. 6(f) is a functional block diagram of a set top box.

Referring now to FIG. 6(f), the present invention may be embodied in a set top box 480. The present invention may be implemented in either or both signal processing and/or control circuits, which are generally identified in FIG. 6(f) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 6G:
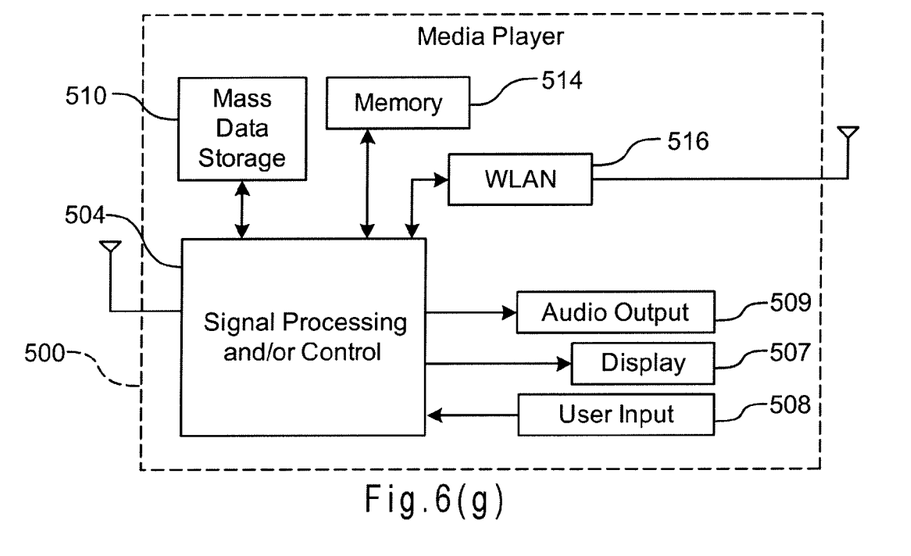
FIG. 6(g) is a functional block diagram of a media player.

Referring now to FIG. 6(g), the present invention may be embodied in a media player 500. The present invention may be implemented in either or both signal processing and/or control circuits, which are generally identified in FIG. 6(g) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8".

Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 6H:
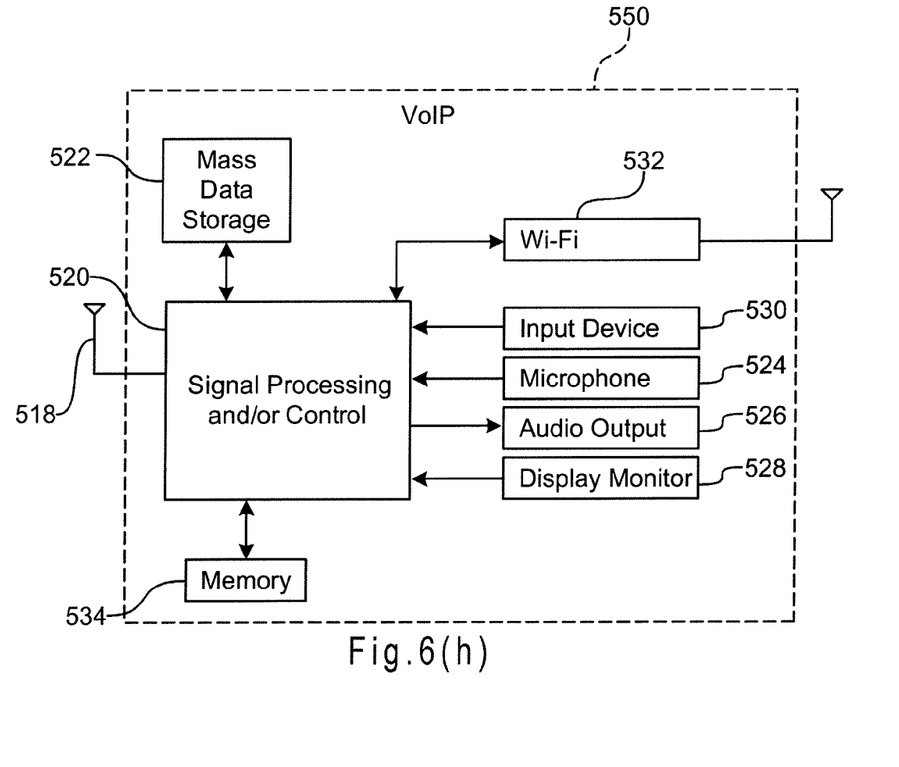
FIG. 6(h) is a functional block diagram of a VoIP phone.

Referring to FIG. 6(h), the present invention may be embodied in a Voice over Internet Protocol (VoIP) phone 550 that may include an antenna 518. The present invention may be implemented in either or both signal processing and/or control circuits, which are generally identified in FIG. 6(h) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is conFIG.d to establish communications link with a VoIP network (not shown) via Wi-Fi communication module 532.

All of the discussion above, regardless of the particular implementation being described, is exemplary in nature, rather than limiting. Although specific components of the clock masking system 200 are described, methods, systems, and articles of manufacture consistent with the clock masking system 200 may include additional or different components. For example, components of the clock masking system 200 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the clock signal generator 10 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected fauns that the invention can take and not as a definition of the invention. It is only the following claims, including all equivalents, that are intended to define the scope of this invention.

What is claimed is:

1. A method comprising:
   driving a clock line with a clock signal;
   communicating the clock signal to a clock input;
   triggering a clock mask with the clock signal to mask the clock input over an entire cycle of the clock signal from transitions on the clock line;
   communicating a first control signal to a set input, the first control signal used to allow a logic element to output the clock signal; and
   communicating a second control signal to a data input, the second control signal used to mask the clock signal.

2. The method of claim 1 comprising communicating the clock signal to the clock input in response to the first control signal.

3. The method of claim 2 wherein the first control signal is a start signal provided by a memory controller.

4. The method of claim 1 comprising masking the clock input from the clock line based on the second control signal.

5. The method of claim 4 wherein the second control signal is a stop signal provided by a memory controller.

6. The method of claim 1 comprising:
   setting a mask control signal within one clock cycle of a final transition of the clock signal; and
   masking the clock input at the final transition.

7. The method of claim 1 comprising setting the first control signal within a preamble period to remove the clock mask to communicate the clock signal to the clock input.

8. The method of claim 1 comprising:
   latching the first control signal to communicate the clock signal to the clock input; and
   latching the second control signal to mask the clock input from transitions on the clock line.

9. An apparatus comprising:
   a logic element having:
      a first input,
      a second input configured to receive a clock signal, and
      a logic element output configured to output a first signal;
   a storage element having:
      a clock input in communication with the logic element output and configured to receive the first signal, and
      a storage element output configured to communicate a second signal to the first input of the logic element, and
   a signal generator in communication with the storage element and configured to generate a first control signal and a second control signal,
   wherein, in response to receiving the first control signal, the storage element output enables the logic element to output the clock signal, and
   wherein, in response to receiving the second control signal, the storage element controls the logic element so that the logic element output is masked.

10. The method of claim 1, wherein the clock line comprises a bidirectional clock bus.

11. The apparatus of claim 9 wherein when a state of the second control signal is stored at the storage element output, the logic element masks the logic element output from the second input.

12. The apparatus of claim 11 wherein the signal generator is adapted to communicate the second control signal to the storage element within one clock cycle of a final transition of the clock signal, and wherein the logic element masks the logic element output at the final transition.

13. The apparatus of claim 9 wherein the signal generator is adapted to set the first control signal within a preamble period to allow the logic element to output the clock signal.

14. The apparatus of claim 9 wherein the signal generator is a logic based memory controller.

15. A method comprising:
    communicating a clock signal from a bidirectional clock bus to a component in communication with a bidirectional data bus;
    triggering a mask with the clock signal to mask the component from the bidirectional clock bus over an entire cycle of the clock signal;
    communicating a first control signal to a storage element to allow a logic circuit to communicate the clock signal from the bidirectional clock bus to the component; and
    communicating a second control signal to the storage element to mask the component from the bidirectional clock bus.

16. The method of claim 15 wherein a falling edge of a clock pulse of the clock signal triggers the mask.

17. The method of claim 15 comprising setting the mask to an off state based on the first control signal.

18. The method of claim 17 comprising maintaining the mask at the off state based on the second control signal.

19. The method of claim 18 comprising:
    communicating the first control signal to a set terminal of a storage element;
    communicating the second control signal to a data input terminal of the storage element;
    communicating the clock signal to a clock input of the storage element; and
    communicating an output signal from the storage element to a gate to mask the component from the bidirectional clock bus.

20. The method of claim 19 comprising:
    communicating the clock signal from the bidirectional clock bus to the gate; and
    communicating a gate output to the component and to the clock input.

21. An apparatus comprising:
    a component having a terminal to receive a clock signal;
    a mask circuit configured to communicate the clock signal from a bidirectional clock bus to the component and to mask the terminal from the bidirectional clock bus, wherein a mask is triggered by the clock signal, and
    a memory controller configured to communicate a first control signal to the mask circuit to allow the mask circuit to communicate the clock signal from the bidirectional clock bus to the component, and to communicate a second control signal to the mask circuit to mask the terminal from the bidirectional clock bus.

22. The apparatus of claim 21 wherein the mask circuit is triggered by a falling edge of a clock pulse of the clock signal.

23. The apparatus of claim 21 wherein the mask circuit includes:
    a set terminal to receive the first control signal;
    a data input terminal to receive the second control signal;
    a clock input to receive the clock signal; and
    a gate to receive an output signal to mask the component from the bidirectional clock bus.

* * * * *